(No Model.)

W. K. MOTTRAM.
THILL SUPPORT.

No. 558,093. Patented Apr. 14, 1896.

Witnesses:
F. G. Fischer
G. Y. Thorpe

Inventor
W. K. Mottram.
By Higdon & Higdon
Attys.

UNITED STATES PATENT OFFICE.

WILLIAM K. MOTTRAM, OF OTTAWA, KANSAS.

THILL-SUPPORT.

SPECIFICATION forming part of Letters Patent No. 558,093, dated April 14, 1896.

Application filed February 3, 1896. Serial No. 577,782. (No model.)

*To all whom it may concern:*

Be it known that I, WILLIAM K. MOTTRAM, of Ottawa, Franklin county, Kansas, have invented certain new and useful Improvements in Thill-Supporters, of which the following is a full, clear, and exact description, reference being had to the accompanying drawings, forming a part thereof.

My invention relates to thill-supports, and my object is to produce a device of this character which may be attached permanently to a vehicle and not interfere in the least with the constant rise-and-fall or "horse" motion of the thills or shafts when the vehicle is in motion, and which, when the animal is unhitched and the thills are elevated to the required height, will automatically lock or secure them in such position.

A further object is to produce a thill-supporter which is adjustable, and may therefore be accommodated to different-proportioned vehicles, as hereinafter particularly described, and pointed out in accompanying claims.

In order that the invention may be fully understood, reference is to be had to the accompanying drawings, in which—

Figure 1:
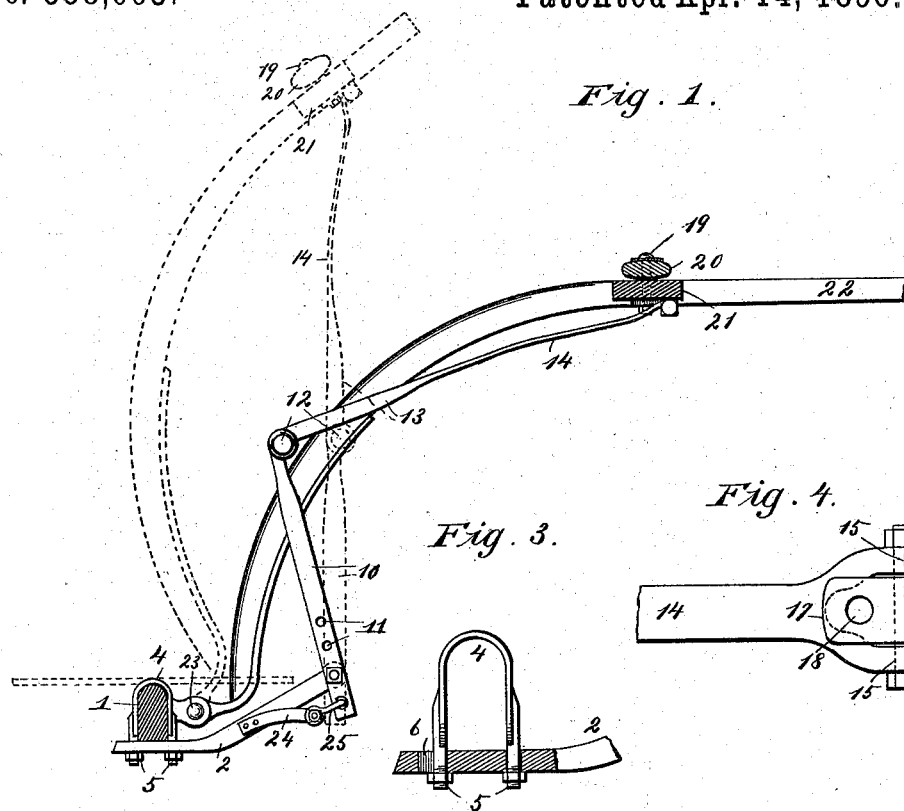
Figure 4:
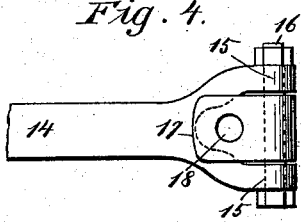
Figure 3:
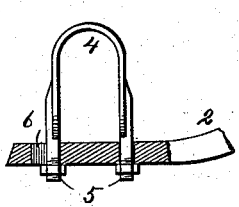
Figure 2:
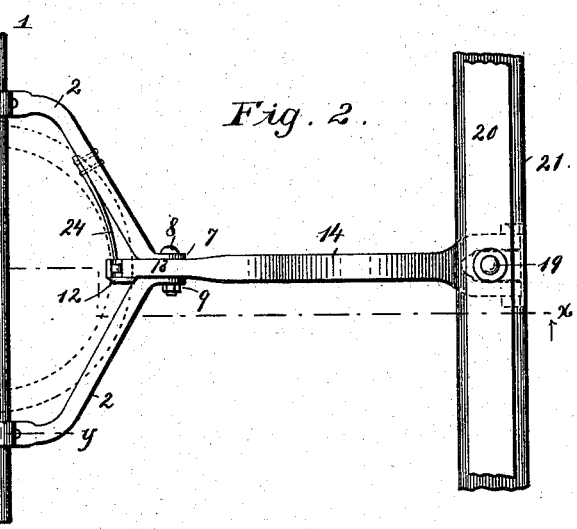

Figure 1 represents my improved thill-supporter as used in connection with the thills of a vehicle and showing its position in full lines when the thills are down and in dotted lines when the thills are put in operation. It is taken on the line *x x* of Fig. 2. Fig. 2 represents a plan view of a part of the same. Fig. 3 represents a cross-section on the line *y y* of Fig. 2, but on a larger scale. Fig. 4 represents, also on a larger scale, a plan view of the front and upper end of the supporter.

In the said drawings, 1 designates the axle of a vehicle.

2 designates angle-irons, which are arranged with their front ends converging forwardly and upwardly, and with their horizontal arms extending parallel with each other and bearing against the under side of the axle at opposite sides of the fifth-wheel of the vehicle, said fifth-wheel being indicated by dotted lines, Fig. 2.

4 designates a pair of inverted-U-shaped spring-clips, which embrace the upper portion of the axle and have their depending arms extending through registering apertures in the horizontal portions of the angle-arms 2, as shown most clearly in Fig. 3, and said clip-arms are engaged at their lower threaded ends by the clamping-nuts 5, which thus secure reliably together the clips and angle-irons in their proper position relative to the longitudinal center of the vehicle. The opening 6 of the angle-irons, through which the rearmost clip-arms extend, are in the form of slots, which extend transversely of the axle. This construction is provided in order that the clips may be secured upon axles of different widths, the spring-clips being adjusted laterally to accommodate the width of the axle, and then secured, as before, by the clamping-nuts 5, as will be readily understood. The front and upper ends of the angle-arms are bent forwardly to form the parallel ears 7, through which extend horizontally the pivot-bolt 8, which is engaged at its threaded end by the clamping-nut 9 to hold it reliably in place. Mounted pivotally upon said bolt between said ears is a bar 10, which is provided with a longitudinal series of holes 11, through one of which the pivoted bolt 8 extends. At its upper end said bar is connected by means of a knuckle or buggy-top hinge 12 to the lower end of a bar 13, which bar continues in the form of a spring 14, which is bent or bowed forward slightly, as indicated in Fig. 1. The upper end of said spring extension 14 is widened and bifurcated, so as to form two parallel arms 15, which are bent around and reliably engage the transversely-extending bolt or rod 16, and mounted pivotally upon said bolt between said arms is the rearwardly-extending plate 17, provided with an opening 18, through which extends the bolt 19, and said bolt also extends centrally through the whiffletree 20 and the interposed cross-bar 21 of the thills or shafts 22, said cross-bar resting squarely and firmly upon the upper side of the plate 17, as shown most clearly in Fig. 1.

The rear ends of the thills or shafts are pivotally mounted in the customary manner upon thill-couplings 23, mounted upon the axle in the customary position. One of said thill-couplings only is illustrated herein.

24 designates a retractile spring which is secured to the inner or rear side of one of the angle-irons 2 and is pivotally connected at its free end, which is disposed in the vertical plane and rearward of the lower end of the bar 10, to a link 25, which in turn pivotally engages one of the holes or apertures in said bar below its pivot 8 or is otherwise pivotally connected to the lower end of said bar, or the spring may be connected directly to said bar without the interposition of a connecting-link 25, or, again, a different form of spring may be employed to accomplish the same purposes, as the particular construction or form of spring is immaterial to my invention, provided it tends at all times to pull or press the lower end of said bar rearwardly.

As hereinbefore described, the clips are adapted to engage axles of any width by reason of their resiliency and the longitudinal slots and smaller apertures of the angle-irons.

In order to adapt the device to vehicles wherein the distance between the cross-bars and the pivots of the thills varies from any cause, the bar 10 is provided with the longitudinal series of holes or apertures, as shown at 11, and with a particular one of which the pivot-bolt engages accordingly as the proportions of such parts of the vehicle direct.

When an animal is hitched to the thills or shafts of a vehicle and to the whiffletree, such parts assume approximately the position shown in full lines in Fig. 1, and my supporter also assumes the position shown in full lines in the drawings. When in this position, it is obvious that the rise and fall of the thills upon the pivots of the thill-couplings 23 is not interfered with in the slightest degree by my improved supporter, owing to the fact that such supporter operates in unison with the thills pivotally upon its hinge-joint 12, as will be readily understood. When the animal is unhitched, however, and as the thills are elevated because they are pivoted rearward of the pivot 8 of the supporter, the bars 10 and 13 of the latter are caused to constantly change their position relative to each other, or, in other words, to gradually straighten, and by the time the shafts have reached or assumed the position illustrated in dotted lines, Fig. 1, where the pivot 16 is nearly vertically above the pivot 8, the said bars of the supporter are brought into direct longitudinal alinement, and form, thereby, owing to the buggy-top-hinge connection, a straight rigid brace, which is supported at its lower end upon the bolt 8, and at its upper end supports in turn the shafts or thills in such elevated position. This straightening of said bars into a single rigid brace is facilitated and made positive and reliable by reason of the spring 24, which, tending to throw the lower end of the bar 10 rearward at all times, succeeds in this endeavor as the thills are being raised, and thereby causes the upper portion of the bar to swing forwardly to the position shown in dotted lines, and as said spring continues to exert an influence on said bar which tends to throw its upper end forward it counteracts the natural tendency of said end to move rearwardly by reason of the weight of the thills supported at the upper end of the bar 13 and which apply their weight or pressure downward and forward. Therefore it is obvious, owing to the forward and downward application of pressure by the thills, which tends to force the junction-point of the arms 10 and 13 rearwardly, that the spring 24 at the lower end, which counteracts such tendency, is a most important and essential element of the supporter—in fact, without such spring or its equivalent the device would be practically inoperative, and with it, as has been proved in practice, it is a thorough and complete success. When in its operative position, as shown in dotted lines, Fig. 1, the pivots 8, 12, and 16 are in direct alinement, and an imaginary line intersecting the centers of such pivots would incline slightly forward and upward.

From the foregoing it is obvious, owing to the use of a buggy-top hinge or knuckle-joint 12, that a direct downward pressure upon the straight rigid brace thus formed would have no effect whatever, and this fact renders important the slight forward bend or bow of the resilient upper end of the bar 14. By reason of such resilient forwardly-bowed portion it is obvious that as the shafts are grasped and a pressure applied upon the brace in pulling downward upon them which is greater than that to which the resilient end of the brace is gaged the upper end of the same will yield or bend forward slightly, and thereby throw the upper pivot 16 out of alinement with the pivots 8 and 12, or, in other words, slightly forward of the imaginary intersecting line running through the pivots hereinbefore referred to. Immediately this is accomplished the buggy-top joint of the brace is "broken," so that the shafts or thills by their own weight will descend and in such descent will cause the various parts to assume the position illustrated in full lines in Fig. 1, as will be readily understood. Thus it is apparent that I have produced a thill-supporter which possesses the advantages enumerated in the statement of invention and which is simple, strong, durable, and inexpensive of construction.

Having thus described the invention, what I claim as new, and desire to secure by Letters Patent, is—

1. A thill-supporter, comprising a rigid support projecting forwardly from the axle of a vehicle, a pair of bars pivotally connecting said support and the cross-bar of the shafts or thills of the vehicle, and connected together by a knuckle-joint or buggy-top hinge, whereby is provided a break-joint brace, and means connected to the bar which is pivoted to said support, which tend continually to advance the upper or knuckle-jointed end of said bar, substantially as described.

2. A thill-supporter, comprising a rigid support projecting forwardly from the axle of a vehicle, a break-joint brace, comprising a bar pivotally connected to said support, and a second bar pivotally connected to the cross-bar of the thills or shafts of the vehicle, and having its upper portion in the form of a resilient extension or spring, and means connected to said rigid support and the first-named pivoted bar of said brace, whereby the upper end of said bar tends to move constantly forward, substantially as described.

3. A thill-supporter, comprising a rigid support projecting forwardly from the axle of a vehicle, a break-joint brace, comprising a bar pivotally connected to said support, and a second bar pivotally connected to the cross-bar of the thills or shafts of the vehicle, and having its upper portion in the form of a resilient extension or spring, which is bent slightly forward, substantially as and for the purpose set forth.

4. In combination with the axle-and-thill construction of a vehicle, a rigid support projecting forwardly from the axle, a bar pivotally connected thereto, a second bar pivotally connected to the upper end of the first-named bar by a buggy-top or knuckle joint, and having its upper portion in the form of a forwardly-bowed resilient extension or spring, a plate pivotally connected to the upper end of said extension and bolted firmly to the cross-bar of the thills or shafts, and a spring secured at one end to the fixed support and at its other end connected to the lower end of the first-named bar, substantially as and for the purpose described.

5. In combination, the axle of a vehicle and the thills mounted in the customary manner, with angle-irons which converge forwardly and upwardly and have their rear ends extending parallel and horizontally at the under side of the axle, and each provided with one longitudinally-elongated opening or slot, and a smaller aperture, spring-clips embracing the upper portion of the axle and provided with arms which project through said elongated and smaller openings of the angle-irons, clamping-nuts engaging their lower ends, a pivot-bolt connecting the front ends of said angle-irons, a bar provided with a longitudinal series of apertures, through one of which said bolt loosely or pivotally extends, a spring connecting one of said angle-irons with the lower end of said bar and tending to move the same rearwardly below its pivot, a second bar connected to the first by a buggy-top or knuckle-joint hinge, so as to form at times in effect a single rigid brace; said first-named bar being provided with a resilient extension or spring which bows slightly forward and is bifurcated at its upper end, a pivot bolt or pin carried thereby, and a plate pivoted in such bifurcation, and a bolt connecting said plate centrally to the lower side of the cross-bar of the thills; such bolt being preferably the same upon which the whiffletree is pivotally mounted, substantially as described.

In testimony whereof I affix my signature in presence of two witnesses.

WILLIAM K. MOTTRAM.

Witnesses:
BELLE BALLANCE,
E. S. SHELDON.